(12) United States Patent
Ohmori et al.

(10) Patent No.: US 10,727,504 B2
(45) Date of Patent: Jul. 28, 2020

(54) METHOD OF OPERATING FUEL CELL

(71) Applicant: HONDA MOTOR CO., LTD, Minato-ku, Tokyo (JP)

(72) Inventors: Suguru Ohmori, Wako (JP); Hiroyuki Tanaka, Wako (JP); Kentaro Ishida, Wako (JP); Yutaka Ebato, Wako (JP); Satoru Terada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 172 days.

(21) Appl. No.: 15/813,276

(22) Filed: Nov. 15, 2017

(65) Prior Publication Data

US 2018/0138525 A1 May 17, 2018

(30) Foreign Application Priority Data

Nov. 17, 2016 (JP) .................................. 2016-223934
Nov. 8, 2017 (JP) .................................. 2017-215332

(51) Int. Cl.
*H01M 8/0282* (2016.01)
*H01M 8/026* (2016.01)
*H01M 8/0273* (2016.01)
*H01M 8/1018* (2016.01)
*H01M 8/0271* (2016.01)
(Continued)

(52) U.S. Cl.
CPC ......... *H01M 8/0282* (2013.01); *H01M 8/026* (2013.01); *H01M 8/0271* (2013.01); *H01M 8/0273* (2013.01); *H01M 8/1004* (2013.01); *H01M 8/1018* (2013.01); *H01M 8/0254* (2013.01); *H01M 2008/1095* (2013.01); *H01M 2250/20* (2013.01); *Y02E 60/521* (2013.01)

(58) Field of Classification Search
CPC ............. H01M 8/0282; H01M 8/0297; H01M 8/0273; H01M 8/0271; H01M 8/0276; H01M 8/1004; H01M 8/026; H01M 8/1018; H01M 8/0254; H01M 2250/20; H01M 2008/1095; Y02E 60/521
See application file for complete search history.

(56) References Cited

U.S. PATENT DOCUMENTS

| 2005/0142397 A1* | 6/2005 | Wakahoi | ............. H01M 4/8605 |
| | | | 429/483 |
| 2008/0199774 A1* | 8/2008 | Giddey | ..................... C25B 9/10 |
| | | | 429/209 |

(Continued)

FOREIGN PATENT DOCUMENTS

WO 2012/137609 10/2012

*Primary Examiner* — Milton I Cano
*Assistant Examiner* — Philip A. Stuckey
(74) *Attorney, Agent, or Firm* — Amin, Turocy & Watson, LLP (57) ABSTRACT

A power generation cell includes a frame member. The frame member includes a first frame shaped sheet and a second frame shaped sheet that are joined together. The second frame shaped sheet is provided outside a cathode through a gap. A method of operating a fuel cell includes supplying a first reactant gas to a channel formed between the frame member and a first separator, a pressure of the first reactant gas being higher than a pressure of a second reactant gas, and supplying the second reactant gas to a channel formed between the frame member and a second separator.

5 Claims, 3 Drawing Sheets

(51) Int. Cl.
*H01M 8/1004* (2016.01)
*H01M 8/0254* (2016.01)

(56) References Cited

U.S. PATENT DOCUMENTS

2013/0089809 A1* 4/2013 Farrington .......... H01M 8/2483
　　　　　　　　　　　　　　　　　　　　　429/492
2014/0017590 A1　1/2014 Sugishita et al.

* cited by examiner

METHOD OF OPERATING FUEL CELL

CROSS-REFERENCE TO RELATED APPLICATIONS

This application is based upon and claims the benefit of priority from Japanese Patent Applications No. 2016-223934 filed on Nov. 17, 2016 and No. 2017-215332 filed on Nov. 8, 2017, the contents all of which are incorporated herein by reference.

BACKGROUND OF THE INVENTION

Field of the Invention

The present invention relates to a method of operating a fuel cell including a frame member at an outer peripheral portion of a membrane electrode assembly.

Description of the Related Art

In general, a solid polymer electrolyte fuel cell employs a solid polymer electrolyte membrane. The solid polymer electrolyte membrane is a polymer ion exchange membrane. The fuel cell includes a membrane electrode assembly (MEA) where an anode is provided on one surface of the solid polymer electrolyte membrane, and a cathode is provided on the other surface of the solid polymer electrolyte membrane.

The membrane electrode assembly is sandwiched between separators (bipolar plates) to form a power generation cell (unit fuel cell). A predetermined number of the power generation cells are stacked together to form a fuel cell stack. In use, for example, the fuel cell stack is mounted in a vehicle as an in-vehicle fuel cell stack.

In recent years, in an attempt to reduce the quantity of the relatively expensive solid polymer electrolyte membrane, and protect the thin solid polymer electrolyte membrane having the low strength, a frame equipped MEA including a resin frame member in its outer periphery has been adopted (see International Publication No. WO 2012/137609).

SUMMARY OF THE INVENTION

In the frame equipped MEA, the inner peripheral portion of the frame member is joined to the membrane electrode assembly, and the outer peripheral portion of the frame member is sandwiched between ridge seals provided for the pair of separators. In order to bring a seal portion into contact with the frame member, the outer peripheral portion of the frame member needs to be thicker than the inner peripheral portion of the frame member. In this regard, it may be considered to adopt structure where a frame shaped sheet is formed by joining two frame shaped sheets having different thicknesses in a manner that the outer peripheral portion of the frame shaped sheet becomes thicker than the inner peripheral portion of the frame shaped sheet. The pressure of the reactant gas supplied to the anode and the pressure of the reactant gas supplied to the cathode may be different. In this case, it is required that two frame shaped sheets are not peeled off from each other by the pressure difference between the reactant gases.

The present invention has been made taking the problems into account, and an object of the present invention is to provide a method of operating a fuel cell equipped with a frame member formed by joining two frame shaped sheets on an outer peripheral portion of a membrane electrode assembly in which it is possible to prevent the two frame shaped sheets from being peed off from each other due to the pressure difference between reactant gases.

In order to solve the above problems, in a method of operating a fuel cell according to the present invention, the fuel cell comprises a membrane electrode assembly, a first separator, and a second separator, the membrane electrode assembly including a first electrode and a second electrode, and an electrolyte membrane interposed between the first electrode and the second electrode, the first separator being stacked on the first electrode of the membrane electrode assembly, the second separator being stacked on the second electrode of the membrane electrode assembly, a first reactant gas being supplied to the first electrode, and a second reactant gas being supplied to the second electrode, wherein a frame member is provided on an outer peripheral portion of the membrane electrode assembly, around the outer peripheral portion, the frame member includes a first frame shaped sheet having an inner peripheral portion joined to the outer peripheral portion of membrane electrode assembly and a second frame shaped sheet thicker than the first frame shaped sheet, and the first frame shaped sheet and the second frame shaped sheet are joined together in a thickness direction, the frame member is sandwiched between the first separator and the second separator, an inner peripheral portion of the first frame shaped sheet is positioned between an outer peripheral portion of the first electrode and an outer peripheral portion of the second electrode, and an inner end of the second frame shaped sheet is positioned outside an outer end of the second electrode through a gap. The method comprises the steps of supplying the first reactant gas to a channel formed between the frame member and the first separator, a pressure of the first reactant gas being higher than a pressure of the second reactant gas, and supplying the second reactant gas to a channel formed between the frame member and the second separator.

A fuel gas as the first reactant gas may be supplied to flow through the channel between the frame member and the first separator, and an oxygen-containing gas as the second reactant gas may be supplied to flow through the channel between the frame member and the second separator.

A surface size of the first electrode may be larger than a surface size of the second electrode, and an outer end of the electrolyte membrane and the outer end of the second electrode may be at same position.

A first reactant gas flow field and a bead seal may be formed on the first separator, the first reactant gas flow field being configured to allow the first reactant gas to flow through the first fuel gas flow field along an electrode surface of the membrane electrode assembly, and the bead seal being provided around the first reactant gas field and expanded toward the frame member for preventing leakage of the first reactant gas, the first reactant gas flow field may include a plurality of flow grooves formed between a plurality of ridges protruding toward the membrane electrode assembly, and the plurality of ridges may be formed at intervals in a flow field width direction of the first reactant gas flow field, and an outer end of the first electrode may be positioned between the bead seal and an end ridge at an outermost position in the flow field width direction among the plurality of ridges.

A second reactant gas flow field and a bead seal may be formed on the second separator, the second reactant gas field being configured to allow the second reactant gas to flow through the second reactant gas flow field along an electrode surface of the membrane electrode assembly, and the bead seal being provided around the second reactant gas field and expanded toward the frame member for preventing leakage of the second reactant gas, the second reactant gas flow field may include a plurality of flow grooves formed between a plurality of ridges protruding toward the membrane electrode assembly, and the plurality of ridges may be formed at intervals in a flow field width direction of the second reactant gas flow field, and the outer end of the second electrode may be positioned between the bead seal and an end ridge at an outermost position in the flow field width direction among the plurality of ridges.

In the method of operating the fuel cell according to the present invention, a differential pressure between reactant gases is applied from the first frame shaped sheet (where the gap is not formed) toward the second frame shaped sheet (where the gap is formed). Therefore, the differential pressure is not applied to the joint surfaces (mating surfaces) between the first frame shaped sheet and the second frame shaped sheet. Therefore, it is possible to prevent the first frame shaped sheet and the second frame shaped sheet from being peeled off from each other due to the differential pressure between the reactant gases.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
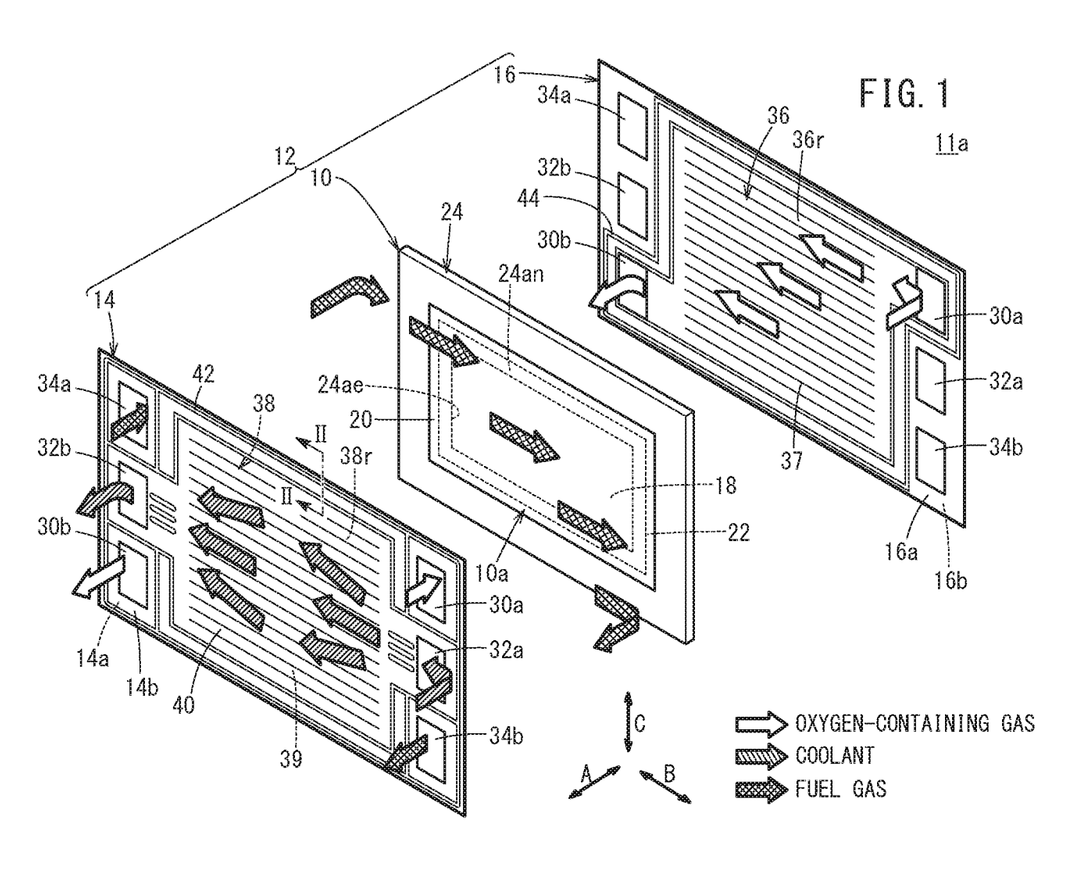
FIG. 1 is an exploded perspective view showing main components of a power generation cell of a fuel cell stack.
Figure 2:
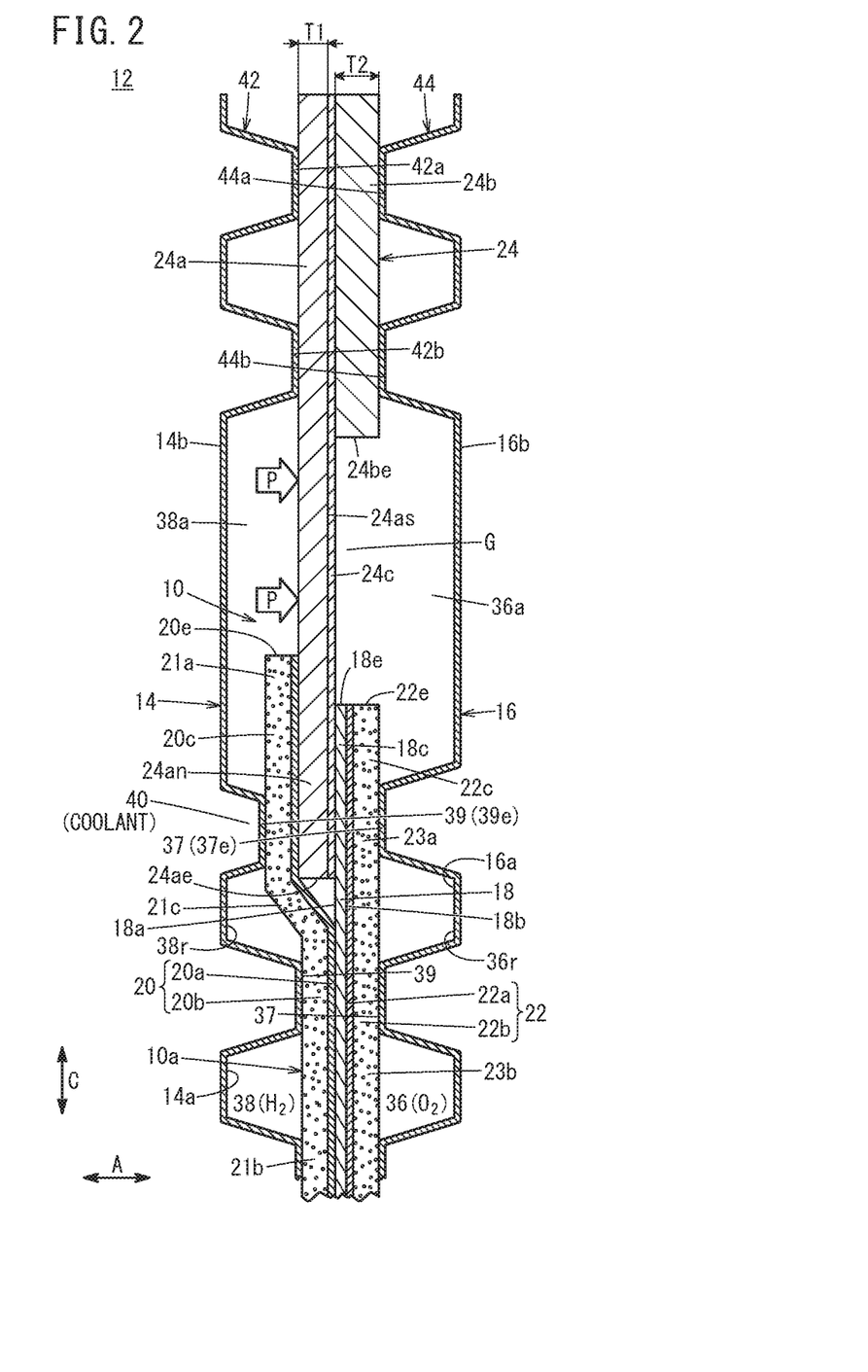
FIG. 2 is a cross sectional view taken along a line II-II in FIG. 1.

As shown in FIGS. 1 and 2, a power generation cell (fuel cell) 12 includes a frame equipped membrane electrode assembly 10 (hereinafter referred to as the "frame equipped MEA 10"), and a first separator 14 and a second separator 16 provided on both sides of the frame equipped MEA 10. The power generation cell 12 is a laterally elongated (or longitudinally elongated) rectangular solid polymer fuel cell. A plurality of the power generation cells 12 are stacked together in a horizontal direction indicated by an arrow A or in a gravity direction indicated by an arrow C to form a fuel cell stack 11a. For example, the fuel cell stack 11a is mounted as an in-vehicle fuel cell stack, in a fuel cell electric automobile (not shown).

The power generation cell 12 is formed by sandwiching the frame equipped MEA 10 between the first separator 14 and the second separator 16. Each of the first separator 14 and the second separator 16 has a laterally elongated (or longitudinally elongated) rectangular shape. For example, the first separator 14 and the second separator 16 are made of metal plates such as steel plates, stainless steel plates, aluminum plates, plated steel sheets, or metal plates having anti-corrosive surfaces by surface treatment. Alternatively, carbon members may be used as the first separator 14 and the second separator 16.

The rectangular frame equipped MEA 10 includes a membrane electrode assembly 10a (hereinafter referred to as the "MEA 10a"). The MEA 10a includes an electrolyte membrane 18, an anode (first electrode) 20 provided on one surface of the electrolyte membrane 18, and a cathode (second electrode) 22 provided on the other surface of the electrolyte membrane 18.

For example, the electrolyte membrane 18 is a solid polymer electrolyte membrane (cation ion exchange membrane). The solid polymer electrolyte membrane is formed by impregnating a thin membrane of perfluorosulfonic acid with water, for example. The electrolyte membrane 18 is interposed between the anode 20 and the cathode 22. A fluorine based electrolyte may be used as the electrolyte membrane 18. Alternatively, an HC (hydrocarbon) based electrolyte may be used as the electrolyte membrane 18.

The surface size (outer size) of the anode 20 is larger than the surface sizes (outer sizes) of the electrolyte membrane 18 and the cathode 22. Instead of adopting the above structure, the surface size of the anode 20 may be smaller than the surface sizes of the electrolyte membrane 18 and the cathode 22.

The anode 20 includes a first electrode catalyst layer 20a joined to one surface 18a of the electrolyte membrane 18 and a first gas diffusion layer 20b stacked on the first electrode catalyst layer 20a. The surface size of the first electrode catalyst layer 20a and the surface size of the first gas diffusion layer 20b are the same, and are larger than the surface sizes of the electrolyte membrane 18 and the cathode 22.

The cathode 22 includes a second electrode catalyst layer 22a joined to a surface 18b of the electrolyte membrane 18 and a second gas diffusion layer 22b stacked on the second electrode catalyst layer 22a. The second electrode catalyst layer 22a and the second gas diffusion layer 22b, and the electrolyte membrane 18 have the same surface size. Therefore, an outer end 22e of the cathode 22 and an outer end 18e of the electrolyte membrane 18 are at the same position in the surface direction of the electrolyte membrane 18 (in the direction indicated by an arrow C in FIG. 2), The surface size of the cathode 22 is smaller than the surface size of the anode 20. The outer end 22e of the cathode 22 and the outer end 18e of the electrolyte membrane 18 are positioned inside an outer end 20e of the anode 20 over the entire periphery.

The surface size of the cathode 22 may be larger than the surface size of the anode 20. The outer end 22e of the cathode 22 may be positioned outside the outer end 20e of the anode 20 over the entire periphery. Alternatively, the surface size of the anode 20 and the surface size of the cathode 22 have the same surface size, and the outer end 20e of the anode 20 and the outer end 22e of the cathode 22 may be at the same position in the surface direction of the electrolyte membrane 18 (indicated by an arrow C in FIG. 2).

The first electrode catalyst layer 20a is formed by porous carbon particles deposited uniformly on the surface of the first gas diffusion layer 20b together with an ion conductive polymer binder and platinum alloy supported on the porous carbon particles. The second electrode catalyst layer 22a is formed by porous carbon particles deposited uniformly on the surface of the second gas diffusion layer 22b together with an ion conductive polymer binder, while platinum alloy is supported on the porous carbon particles.

Each of the first gas diffusion layer 20b and the second gas diffusion layer 22b comprises a carbon paper or a carbon cloth, etc. The surface size of the second gas diffusion layer 22b is smaller than the surface size of the first gas diffusion layer 20b. The first electrode catalyst layer 20a and the second electrode catalyst layer 22a are formed on both surfaces of the electrolyte membrane 18, respectively.

The frame equipped MEA 10 is formed around the entire periphery of the electrolyte membrane 18, and includes a frame member 24 joined to the anode 20 and the cathode 22. The frame member 24 includes two frame shaped sheets having different thicknesses. Specifically, the frame member 24 includes a first frame shaped sheet 24a including an inner peripheral portion 24an joined to an outer peripheral portion of the MEA 10a, and a second frame shaped sheet 24b joined to the first frame shaped sheet 24a. The first frame shaped sheet 24a and the second frame shaped sheet 24b are joined together in the thickness direction by an adhesive layer 24c made of adhesive. The second frame shaped sheet 24b is joined to an outer peripheral portion of the first frame shaped sheet 24a. In the structure, the outer peripheral portion of the frame member 24 is thicker than the inner peripheral portion of the frame member 24.

The first frame shaped sheet 24a and the second frame shaped sheet 24b are made of resin material. Examples of materials of the first frame shaped sheet 24a and the second frame shaped sheet 24b include PPS (poly phenylene sulfide), PPA (polyphthalamide), PEN (polyethylene naphthalate), PES (polyethersulfone), LCP (liquid crystal polymer), PVDF (polyvinylidene fluoride), a silicone resin, a fluoro-silicone resin, m-PPE (modified poly phenylene ether resin), PET (polyethylene terephthalate), PBT (polybutylene terephthalate), or modified polyolefin.

The inner peripheral portion 24an of the first frame shaped sheet 24a is positioned between an outer peripheral portion 20c of the anode 20 and an outer peripheral portion 22c of the cathode 22. Specifically, the inner peripheral portion 24an of the first frame shaped sheet 24a is sandwiched between an outer peripheral portion 18c of the electrolyte membrane 18 and the outer peripheral portion 20c of the anode 20. The inner peripheral portion 24an of the first frame shaped sheet 24a and the outer peripheral portion 18c of the electrolyte membrane 18 are joined together through the adhesive layer 24c. It should be noted that the inner peripheral portion 24an of the first frame shaped sheet 24a may be sandwiched between the electrolyte membrane 18 and the cathode 22.

The anode 20 includes a step at a position corresponding to an inner end 24ae of the first frame shaped sheet 24a. Specifically, the anode 20 includes an inclined area 21c inclined from the electrolyte membrane 18, between an area 21a overlapped with the inner peripheral portion 24an of the first frame shaped sheet 24a and an area 21b overlapped with the electrolyte membrane 18. Therefore, in the inclined area 21c, the first electrode catalyst layer 20a and the first gas diffusion layer 20b are inclined from the electrolyte membrane 18.

In the anode 20, a surface of the area 21a adjacent to the first separator 14, overlapped with the inner peripheral portion 24an of the first frame shaped sheet 24a is positioned remotely from the electrolyte membrane 18, in comparison with a surface of the area 21b adjacent to the first separator 14, overlapped with the electrolyte membrane 18.

The cathode 22 has a flat shape, from an area 23b overlapped with the electrolyte membrane 18 to an area 23a overlapped with the inner peripheral portion 24an of the first frame shaped sheet 24a. Therefore, the second electrode catalyst layer 22a and the second gas diffusion layer 22b are in parallel to the electrolyte membrane 18 from the area 23b overlapped with the electrolyte membrane 18 to the area 23a overlapped with the inner peripheral portion 24an of the first frame shaped sheet 24a.

Further, unlike the above structure, the anode 20 may have a flat shape from the area 21b overlapped with the electrolyte membrane 18 to the area 21a overlapped with the inner peripheral portion 24an of the first frame shaped sheet 24a, and the cathode 22 may have an inclined area inclined from the electrolyte membrane 18, between the area 23b overlapped with the electrolyte membrane 18 and the area 23a overlapped with the inner peripheral portion 24an of the first frame shaped sheet 24a.

The second frame shaped sheet 24b is joined to the outer peripheral portion of the first frame shaped sheet 24a. The thickness T2 of the second frame shaped sheet 24b is larger than the thickness T1 of the first frame shaped sheet 24a. In the structure, since the outer peripheral portion of the frame member 24 becomes thick, a bead seal can be used suitably for sealing. An inner end 24be of the second frame shaped sheet 24b is positioned outside the inner end 24ae of the first frame shaped sheet 24a (in a direction away from the MEA 10a), and positioned outside the outer end 20e of the anode 20 and the outer end 22e of the cathode 22. A gap G is formed between the inner end 24be of the second frame shaped sheet 24b and the outer end 22e of the cathode 22. The gap G forms a part of a channel 36a described later.

The adhesive layer 24c is provided over an entire surface 24as of the first frame shaped sheet 24a on a side closer to the second frame shaped sheet 24b (cathode side). The first frame shaped sheet 24a is exposed to the gap G (channel 36a), through the adhesive layer 24c, at a position of the gap G. As the adhesive layer 24c, for example, liquid adhesive or a hot melt sheet is provided. The adhesive is not limited to liquid or solid adhesive, and not limited to thermoplastic or thermosetting adhesive.

As shown in FIG. 1, at one end of the power generation cell 12 in the horizontal direction indicated by the arrow B, an oxygen-containing gas supply passage 30a, a coolant supply passage 32a, and a fuel gas discharge passage 34b are provided. The oxygen-containing gas supply passage 30a, the coolant supply passage 32a, and the fuel gas discharge passage 34b extend through the power generation cell 12 in the stacking direction indicated by the arrow A. The oxygen-containing gas is supplied through the oxygen-containing gas supply passage 30a, and the coolant is supplied through the coolant supply passage 32a. A fuel gas such as a hydrogen-containing gas is discharged through the fuel gas discharge passage 34b. The oxygen-containing gas supply passage 30a, the coolant supply passage 32a, and the fuel gas discharge passage 34b are arranged in the vertical direction indicated by the arrow C.

At the other end of the power generation cell 12 in the direction indicated by the arrow B, a fuel gas supply passage 34a for supplying the fuel gas, a coolant discharge passage 32b for discharging the coolant, and an oxygen-containing gas discharge passage 30b for discharging the oxygen-containing gas are provided. The fuel gas supply passage 34a, the coolant discharge passage 32b, and the oxygen-containing gas discharge passage 30b extend through the power generation cell 12 in the direction indicated by the arrow A. The fuel gas supply passage 34a, the coolant discharge passage 32b, and the oxygen-containing gas discharge passage 30b are arranged in the direction indicated by the arrow C.

The second separator 16 has an oxygen-containing gas flow field 36 on its surface 16a facing the frame equipped MEA 10. The oxygen-containing gas flow field 36 is connected to the oxygen-containing gas supply passage 30a and the oxygen-containing gas discharge passage 30b. Specifically, the oxygen-containing gas flow field 36 is formed between the second separator 16 and the frame equipped MEA 10. The oxygen-containing gas flow field 36 includes a plurality of flow grooves 36r extending in the direction in the direction indicated by the arrow B. The flow grooves 36r form straight flow grooves or wavy (serpentine) flow grooves.

The first separator 14 has a fuel gas flow field 38 on its surface 14a facing the frame equipped MEA 10. The fuel gas flow field 38 is connected to the fuel gas supply passage 34a and the fuel gas discharge passage 34b. Specifically, the fuel gas flow field 38 is formed between the first separator 14 and the frame equipped MEA 10. Specifically, the fuel gas flow field 38 includes flow grooves 38r extending in the direction indicated by the arrow B. The flow grooves 38r form straight flow grooves or wavy (serpentine) flow grooves.

A coolant flow field 40 is formed between a surface 14b of the first separator 14 and a surface 16b of the second separator 16. The coolant flow field 40 is connected to the coolant supply passage 32a and the coolant discharge passage 32b. The coolant flow field 40 extends in the direction indicated by the arrow B.

As shown in FIG. 2, a plurality of ridges 39 forming the fuel gas flow field 38 are provided on the surface 14a of the first separator 14 (surface facing the frame equipped MEA 10). The ridges 39 protrude toward the anode 20, and contact the anode 20. The ridges 39 extend in the flow direction in the fuel gas flow field 38, and the ridges 39 are formed at intervals in the flow field width direction of the fuel gas flow field 38 indicated by the arrow C. The plurality of flow grooves 38r are formed between the ridges 39.

The plurality of ridges 37 forming an oxygen-containing gas flow field 36 are provided on the surface 16a of the second separator 16 (surface facing the frame equipped MEA 10). The ridges 37 protrude toward the cathode 22, and contact the cathode 22. The ridges 37 extend in the flow direction in the oxygen-containing gas flow field 36, and the ridges 37 are formed at intervals in the flow field width direction of the oxygen-containing gas flow field 36 indicated by the arrow C. The plurality of flow grooves 36r are formed between the ridges 37. The MEA 10a is sandwiched between the ridges 37, 39.

A first seal line 42 (metal bead seal) is provided on the surface 14a of the first separator 14 around the outer peripheral portion of the first separator 14 for preventing leakage of the fuel gas to the outside. The first seal line 42 is expanded toward the frame member 24, and contacts the first frame shaped sheet 24a (area overlapped with the second frame shaped sheet 24b) in an air tight and liquid tight manner. The first seal line 42 includes an outer bead 42a and an inner bead 42b provided inside the outer bead 42a. The outer end 20e of the anode 20 is positioned between an end ridge 39e at the outermost position in the flow field width direction among the plurality of ridges 39 and the first seal line 42 (inner bead 42b). It should be noted that the first seal line 42 may be formed by only one of the outer bead 42a and the inner bead 42b.

The inner bead 42b is provided around the fuel gas flow field 38, the fuel gas supply passage 34a, and the fuel gas discharge passage 34b in a manner that the fuel gas flow field 38 is connected to the fuel gas supply passage 34a and the fuel gas discharge passage 34b. Each of the beads 42a, 42b has a tapered shape which gets narrower toward the front end (toward the frame member 24) in cross section. The front end of each of the beads 42a, 42b may have a flat shape (or a curved shape).

A channel 38a formed between the first separator 14 and the frame member 24 is connected to the fuel gas flow field 38 inside the first seal line 42 (on the MEA 10a side). Therefore, the fuel gas is supplied to the channel 38a.

A second seal line 44 (metal bead seal) is provided on the surface 16a of the second separator 16 around the outer peripheral portion of the second separator 16 for preventing leakage of the oxygen-containing gas to the outside. The second seal line 44 is expanded toward the frame member 24, and contacts the second frame shaped sheet 24b in an air tight and liquid tight manner. The first seal line 42 and the second seal line 44 face each other through the frame member 24. The frame member 24 is sandwiched between the first seal line 42 and the second seal line 44. The second seal line 44 includes an outer bead 44a, and an inner bead 44b provided inside the outer bead 44a.

The inner bead 44b is provided around the oxygen-containing gas flow field 36, the oxygen-containing gas supply passage 30a, and the oxygen-containing gas discharge passage 30b in a manner that the oxygen-containing gas flow field 36 is connected to the oxygen-containing gas supply passage 30a and the oxygen-containing gas discharge passage 30b. Each of the beads 44a, 44b has a tapered shape which gets narrower toward the front end (toward the frame member 24) in cross section. The front end of each of the beads 44a, 44b may have a flat shape (or a curved shape). The outer end 22e of the cathode 22 is positioned between an end ridge 37e at the outermost position in the flow field width direction among the plurality of ridges 37 and the second seal line 44 (inner bead 44b).

The channel 36a formed between the second separator 16 and the frame member 24, inside the second seal line 44 (adjacent to the MEA 10a) is connected to the oxygen-containing gas flow field 36. Therefore, the oxygen-containing gas is supplied to the channel 36a.

Figure 3:
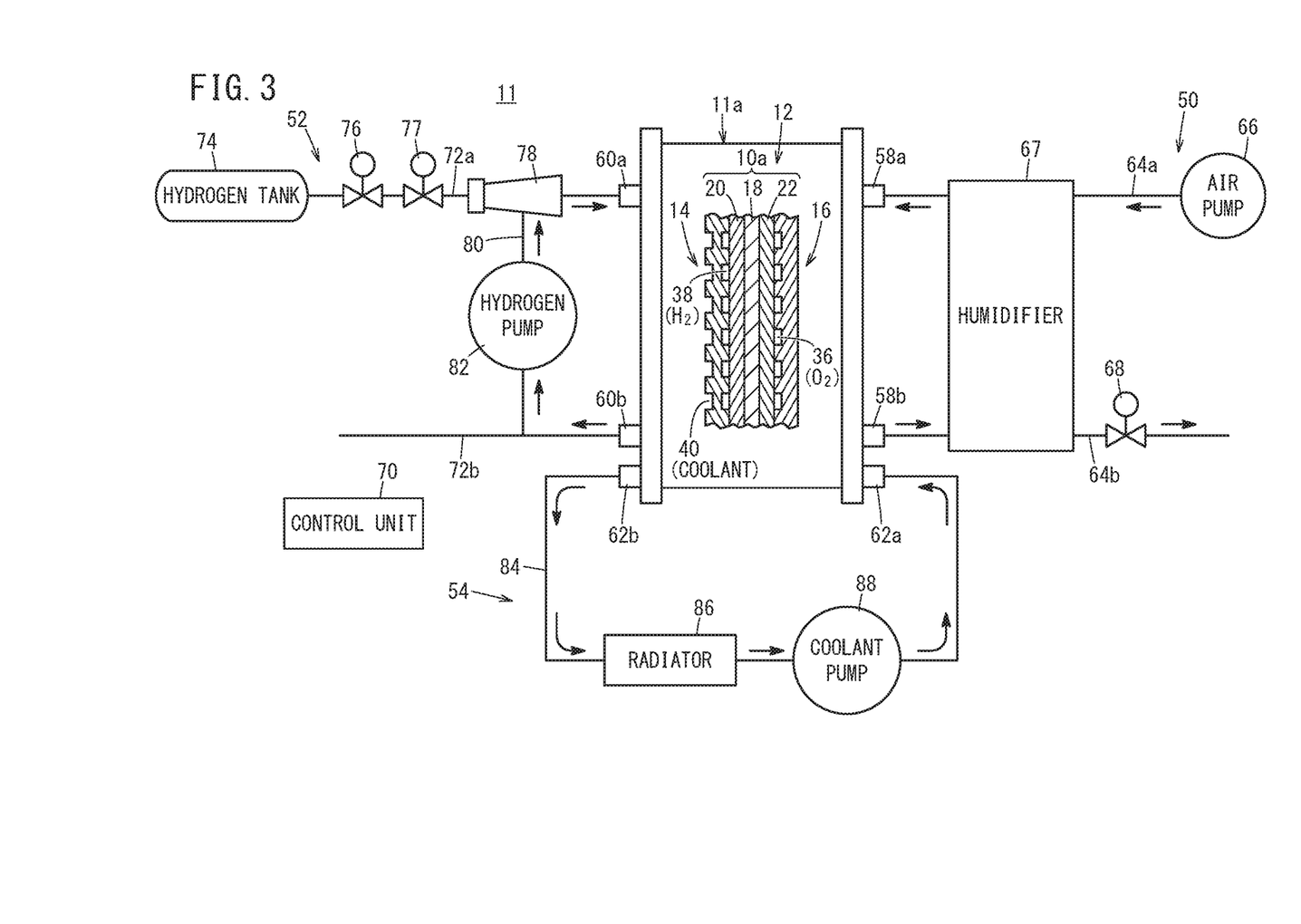
FIG. 3 is an overall diagram schematically showing a fuel cell system.

In FIG. 3, a fuel cell system 11 includes the above described fuel cell stack 11a, an oxygen-containing gas supply apparatus 50 for supplying the oxygen-containing gas to the fuel cell stack 11a, a fuel gas supply apparatus 52 for supplying the fuel gas to the fuel cell stack 11a, and a coolant supply apparatus 54 for supplying the coolant to the fuel cell stack 11a.

The oxygen-containing gas supply apparatus 50 includes an oxygen-containing gas supply pipe 64a connected to the oxygen-containing gas supply passage 30a (see FIG. 1) through an oxygen-containing gas supply manifold 58a provided for the fuel cell stack 11a, and an oxygen-containing gas discharge pipe 64b connected to the oxygen-containing gas discharge passage 30b (see FIG. 1) through an oxygen-containing gas discharge manifold 58b provided for the fuel cell stack 11a. An air pump 66 is provided for the oxygen-containing gas supply pipe 64a. A pressure regulating valve 68 is provided in the oxygen-containing gas discharge pipe 64b.

A humidifier 67 is provided for the oxygen-containing gas supply pipe 64a and the oxygen-containing gas discharge pipe 64b. The structure of the humidifier 67 is not particularly limited as long as the humidifier 67 can humidify the air to be supplied to the fuel cell stack 11a. In the oxygen-containing gas supply pipe 64a, the air pump 66 is provided upstream of the humidifier 67. In the oxygen-containing gas discharge pipe 64b, the pressure regulating valve 68 is provided downstream of the humidifier 67. For example, a control unit 70 of the fuel cell system 11 controls at least one of the operation speed of the air pump 66 and the valve opening angle of the pressure regulating valve 68 to control the pressure of the oxygen-containing gas flowing through the oxygen-containing gas flow field 36.

The fuel gas supply apparatus 52 includes a fuel gas supply pipe 72a connected to the fuel gas supply passage 34a (see FIG. 1) through a fuel gas supply manifold 60a provided for the fuel cell stack 11a, and a fuel gas discharge pipe 72b connected to the fuel gas discharge passage 34b (see FIG. 1) through a fuel gas discharge manifold 60b provided for the fuel cell stack 11a.

A hydrogen tank 74 for storing high pressure hydrogen is provided upstream of the fuel gas supply pipe 72a. In the fuel gas supply pipe 72a, a stop valve 76, a pressure regulating valve 77, and an ejector 78 are provided between the fuel gas supply manifold 60a and the hydrogen tank 74. A hydrogen circulation channel 80 is connected to the ejector 78 and the fuel gas discharge pipe 72b. A hydrogen pump 82 for hydrogen circulation is provided in the hydrogen circulation channel 80. The control unit 70 controls the speed of operating the hydrogen pump 82 to control the flow rate of the fuel gas flowing through the fuel gas flow field 38.

The coolant supply apparatus 54 includes a coolant circulation channel 84 for circulating, and supplying the coolant to the fuel cell stack 11a. The coolant circulation channel 84 is connected to the coolant supply passage 32a (see FIG. 1) through a coolant supply manifold 62a provided for the fuel cell stack 11a. The coolant circulation channel 84 is connected to the coolant discharge passage 32b (see FIG. 1) through a coolant discharge manifold 62b. A radiator 86 and a coolant pump 88 are provided for the coolant circulation channel 84.

Operation of the fuel cell system 11 including a power generation cell 12 (fuel cell stack 11a) having the above structure will be described below in relation to a method of operating the fuel cell according to the embodiment of the present invention.

As shown in FIG. 3, in the oxygen-containing gas supply apparatus 50, the air is supplied to the oxygen-containing gas supply pipe 64a under operation of the air pump 66. After the air flows through the humidifier 67 for humidification, the humidified air is supplied to the oxygen-containing gas supply passage 30a (see FIG. 1) through the oxygen-containing gas supply manifold 58a. The humidifier 67 adds the water and the heat discharged from the oxygen-containing gas discharge manifold 58b to the air to be supplied. In the meanwhile, in the fuel gas supply apparatus 52, under opening operation of the stop valve 76, the fuel gas is supplied from the hydrogen tank 74 to the fuel gas supply pipe 72a. The fuel gas is supplied to the fuel gas supply passage 34a (see FIG. 1) through the fuel gas supply manifold 60a. Further, in the coolant supply apparatus 54, under operation of the coolant pump 88, the coolant is supplied from the coolant circulation channel 84 to the coolant supply passage 32a (see FIG. 1).

Therefore, as shown in FIG. 1, an oxygen-containing gas is supplied to the oxygen-containing gas supply passage 30a, and a fuel gas such as a hydrogen-containing gas is supplied to the fuel gas supply passage 34a. Further, a coolant such as pure water, ethylene glycol, oil is supplied to the coolant supply passage 32a.

Therefore, the oxygen-containing gas flows from the oxygen-containing gas supply passage 30a to the oxygen-containing gas flow field 36 of the second separator 16, and moves in the direction indicated by the arrow B, and the oxygen-containing gas is supplied to the cathode 22 of the MEA 10a. In the meanwhile, the fuel gas flows from the fuel gas supply passage 34a to the fuel gas flow field 38 of the first separator 14. The fuel gas moves along the fuel gas flow field 38 in the direction indicated by the arrow B, and the fuel gas is supplied to the anode 20 of the MEA 10a.

Thus, in the MEA 10a, the oxygen-containing gas supplied to the cathode 22, and the fuel gas supplied to the anode 20 are partially consumed in the second electrode catalyst layer 22a and the first electrode catalyst layer 20a by electrochemical reactions to generate electrical energy.

In this case, the pressure of the first reactant gas (fuel gas) supplied to the fuel gas flow field 38 is higher than the pressure of the second reactant gas (oxygen-containing gas) supplied to the oxygen-containing gas flow field 36. Therefore, in FIG. 2, the first reactant gas flows through the channel 38a formed between the first separator 14 and the frame member 24. The pressure of the first reactant gas is higher than the pressure of the second reactant gas. Therefore, the differential pressure P is applied to the frame member 24 provided between the channel 36a and the channel 38a, from the first frame shaped sheet 24a toward the second frame shaped sheet 24b (i.e., from the first separator 14 toward the second separator 16). Preferably, the differential pressure P is 5 to 300 kPa, and preferably, 10 to 200 kPa.

Then, in FIG. 1, the oxygen-containing gas supplied to, and partially consumed at the cathode 22 is discharged in the direction indicated by the arrow A along the oxygen-containing gas discharge passage 30b. Likewise, the fuel gas supplied to, and partially consumed at the anode 20 is discharged in the direction indicated by the arrow A along the fuel gas discharge passage 34b.

Further, the coolant supplied to the coolant supply passage 32a flows into the coolant flow field 40 between the first separator 14 and the second separator 16, and then, the coolant flows in the direction indicated by the arrow B. After the coolant cools the MEA 10a, the coolant is discharged through the coolant discharge passage 32b.

In the embodiment of the present invention, as shown in FIG. 2, the frame member 24 includes the first frame shaped sheet 24a having the inner peripheral portion 24an joined to the outer peripheral portion of the MEA 10a, and the second frame shaped sheet 24b thicker than the first frame shaped sheet 24a. The first frame shaped sheet 24a and the second frame shaped sheet 24b are joined together in the thickness direction. The inner peripheral portion 24an of the first frame shaped sheet 24a is provided between the outer peripheral portion 20c of the anode 20 and the outer peripheral portion 22c of the cathode 22. The inner end 24be of the second frame shaped sheet 24b is provided outside the outer end 22e of the cathode 22 through the gap G. Further, the channel 38a is provided between the frame member 24 and the first separator 14, for allowing the first reactant gas (in the embodiment, fuel gas) having the pressure which is higher than the pressure of the second reactant gas (in the embodiment, the oxygen-containing gas) to flow through the channel 38a. The channel 36a is provided between the frame member 24 and the second separator 16, for allowing the second reactant gas to flow through the channel 36a.

As described above, in the power generation cell 12, the gap G is provided on the side where the pressure of the reactant gas is low. That is, the second frame shaped sheet 24b is provided on the side where the pressure of the reactant gas is low. In the structure, the differential pressure P between reactant gases is applied from the first frame shaped sheet 24a (where the gap G is not formed) toward the second frame shaped sheet 24b (where the gap G is formed). The differential pressure P is not applied to the joint surfaces (mating surfaces) between the first frame shaped sheet 24a and the second frame shaped sheet 24b. Therefore, the effect of preventing the first frame shaped sheet 24a and the second frame shaped sheet 24b from being peeled off from each other due to the differential pressure P between the reactant gases is obtained advantageously.

In contrast, unlike the embodiment, in the case where the gap G is provided (second frame shaped sheet 24b is provided) on the side where the pressure of the reactant gas is high, the differential pressure between the reactant gases is applied from the side where the gap G is formed toward the side where the gap G is not formed. In particular, the differential pressure is applied at the position of the inner end 24be of the second frame shaped sheet 24b in the direction to move the first frame shaped sheet 24a away from the second frame shaped sheet 24b. For this reason, the first frame shaped sheet 24a may be peeled off from the second frame shaped sheet 24b.

In contrast, in the embodiment of the present invention, as described above, since the gap G is provided on the side where the pressure of the reactant gas is small, the differential pressure P is applied in the direction for pressing the first frame shaped sheet 24a toward the second frame shaped sheet 24b. Therefore, it is possible to prevent the first frame shaped sheet 24a and the second frame shaped sheet 24b from being peeled off from each other.

Further, in the embodiment of the present invention, among the first electrode (anode 20) and the second electrode (cathode 22), one of the electrodes (anode 20), includes the inclined area 21c inclined from the electrolyte membrane 18, between the area 21b overlapped with the electrolyte membrane 18 and the area 21a overlapped with the inner peripheral portion 24an of the first frame shaped sheet 24a. The other electrode (cathode 22) has a flat shape from the area 23b overlapped with the electrolyte membrane 18 to the area 23a overlapped with the inner peripheral portion 24an of the first frame shaped sheet 24a. Further, the outer peripheral portion 18c of the electrolyte membrane 18 is positioned between the other electrode (cathode 22) and the inner peripheral portion 24an of the first frame shaped sheet 24a. In the structure, since no steps are formed in the electrolyte membrane 18, it is possible to suppress damage of the electrolyte membrane 18 during its production.

Further, in the embodiment of the present invention, the adhesive layer 24c is provided over the entire surface of the first frame shaped sheet 24a adjacent to the second frame shaped sheet 24b. In the structure, it is possible to join the inner peripheral portion of the frame member 24 (inner peripheral portion 24an of the first frame shaped sheet 24a) and the outer peripheral portion of the MEA 10a together suitably. Further, it is possible to provide the adhesive layer 24c for the first frame shaped sheet 24a easily, and no masking, etc. is required.

The surface size of the anode 20 is larger than the surface size of the cathode 22. The outer end 18e of the electrolyte membrane 18 and the outer end 22e of the cathode 22 are at the same position. In the structure, it is possible to prevent the electrolyte membrane 18 from being damaged due to the differential pressure applied to the position of the electrolyte membrane 18 corresponding to the outer end 22e of the cathode 22.

The present invention is not limited to the above embodiments. Various modifications can be made without departing from the gist of the present invention.

What is claimed is:

1. A method of operating a fuel cell comprising a membrane electrode assembly, a first separator, and a second separator, the membrane electrode assembly including a first electrode and a second electrode, and an electrolyte membrane interposed between the first electrode and the second electrode, the first separator being stacked on the first electrode of the membrane electrode assembly, the second separator being stacked on the second electrode of the membrane electrode assembly, a first reactant gas being supplied to the first electrode, and a second reactant gas being supplied to the second electrode, wherein a frame member is provided on an outer peripheral portion of the membrane electrode assembly, around the outer peripheral portion, the frame member includes a first frame shaped sheet having an inner peripheral portion joined to the outer peripheral portion of membrane electrode assembly and a second frame shaped sheet thicker than the first frame shaped sheet, and the first frame shaped sheet and the second frame shaped sheet are joined together in a thickness direction;

the frame member is sandwiched between the first separator and the second separator;

the inner peripheral portion of the first frame shaped sheet is positioned between an outer peripheral portion of the first electrode and an outer peripheral portion of the second electrode in a thickness direction of the frame member; and an inner end face of the second frame shaped sheet is positioned outside an outer end face of the second electrode through a gap, the method comprising the steps of:

supplying the first reactant gas to a channel formed between the frame member and the first separator, a pressure of the first reactant gas being higher than a pressure of the second reactant gas;

supplying the second reactant gas to a channel formed between the frame member and the second separator; and a differential pressure of the first reactant gas and the second reactant gas is applied to the first frame shaped sheet at an area opposed to the gap in a direction from the first separator toward the gap.

2. The method of operating the fuel cell according to claim 1, comprising the steps of:

supplying a fuel gas as the first reactant gas to flow through the channel between the frame member and the first separator; and supplying an oxygen-containing gas as the second reactant gas to flow through the channel between the frame member and the second separator.

3. The method of operating the fuel cell according to claim 1, wherein a surface size of the first electrode is larger than a surface size of the second electrode; and an outer end face of the electrolyte membrane and the outer end face of the second electrode are at same position.

4. The method of operating the fuel cell according to claim 1, wherein a first reactant gas flow field and a bead seal are formed on the first separator, the first reactant gas field being configured to allow the first reactant gas to flow through the first fuel gas flow field along an electrode surface of the membrane electrode assembly, and the bead seal being provided around the first reactant gas field and expanded toward the frame member for preventing leakage of the first reactant gas;

the first reactant gas flow field includes a plurality of flow grooves formed between a plurality of ridges protruding toward the membrane electrode assembly, and the plurality of ridges are formed at intervals in a flow field width direction of the first reactant gas flow field; and an outer end face of the first electrode is positioned between the bead seal and an end ridge at an outermost position in the flow field width direction among the plurality of ridges.

5. The method of operating the fuel cell according to claim 1,
wherein a second reactant gas flow field and a bead seal are formed on the second separator, the second reactant gas field being configured to allow the second reactant gas to flow through the second reactant gas flow field along an electrode surface of the membrane electrode assembly, and the bead seal being provided around the second reactant gas field and expanded toward the frame member for preventing leakage of the second reactant gas;

the second reactant gas flow field includes a plurality of flow grooves formed between a plurality of ridges protruding toward the membrane electrode assembly, and the plurality of ridges are formed at intervals in a flow field width direction of the second reactant gas flow field; and the outer end face of the second electrode is positioned between the bead seal and an end ridge at an outermost position in the flow field width direction among the plurality of ridges.

\* \* \* \* \*